United States Patent [19]
Gradel

[11] Patent Number: 5,516,240
[45] Date of Patent: May 14, 1996

[54] DEVICE FOR MILLING

[76] Inventor: Pierre Gradel, Les Folliets, 74130 Ayze, France

[21] Appl. No.: 256,767

[22] Filed: Jul. 21, 1994

[30] Foreign Application Priority Data

Feb. 27, 1992 [FR] France ............................. 92 02550

[51] Int. Cl.$^6$ ................................. B23C 3/04; B23G 1/18
[52] U.S. Cl. .................................... 409/77; 470/81
[58] Field of Search ....................... 29/27 C, 27 R; 470/81; 82/110; 409/65, 71, 77, 26, 39

[56] References Cited

U.S. PATENT DOCUMENTS

| | | | |
|---|---|---|---|
| 1,384,913 | 7/1921 | Olson et al. | 470/81 |
| 1,404,386 | 1/1922 | Graver | 470/81 |
| 1,434,430 | 11/1922 | Cornélis | 470/81 |
| 1,461,219 | 7/1923 | Miller | 409/39 |
| 1,562,705 | 11/1925 | Kunkle | 470/81 |
| 1,681,994 | 8/1928 | Miller | 409/39 |
| 1,853,643 | 4/1932 | Simmons | 409/39 |
| 3,230,830 | 1/1966 | Romi | 409/39 |
| 3,854,353 | 12/1974 | Cutler | 82/110 X |

FOREIGN PATENT DOCUMENTS 511480  12/1920  France .

OTHER PUBLICATIONS

Publication "Afwikkeldraaien", by B. van der Horst, in Metaal–bewerking, No. 20, Mar. 30, 1967, pp. 381–383.

*Primary Examiner*—William Briggs
*Attorney, Agent, or Firm*—William H. Eilberg

[57] ABSTRACT

In accordance with the invention, the workpiece (1) is mounted on a lathe headstock spindle rotated by drive means about a headstock spindle axis (I—I). A turning tool (3) is mounted on a toolholder carriage adapted to move in translation along an infeed axis (III) and along a carriage axis (IV). The turning tool (3) has a cutting edge (4) made up of a plurality of cutting edge portions adapted to be individually engaged with the workpiece (1). The turning tool (3) is rotated about an axis (II) which is not parallel to the headstock spindle axis (I—I) to bring the separate portions of the cutting edge (4) of the turning tool (3) successively into contact with the workpiece (1). The invention can be used to cut helical threads.

5 Claims, 6 Drawing Sheets

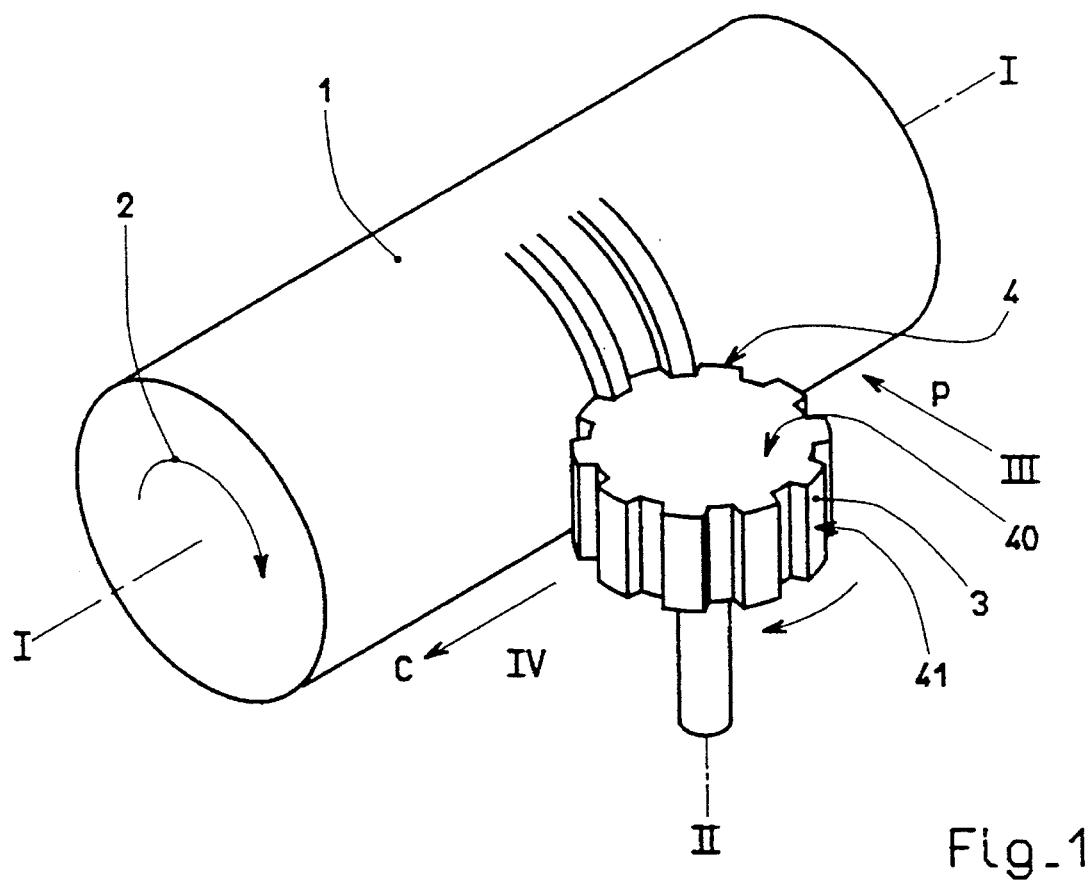
Fig_1
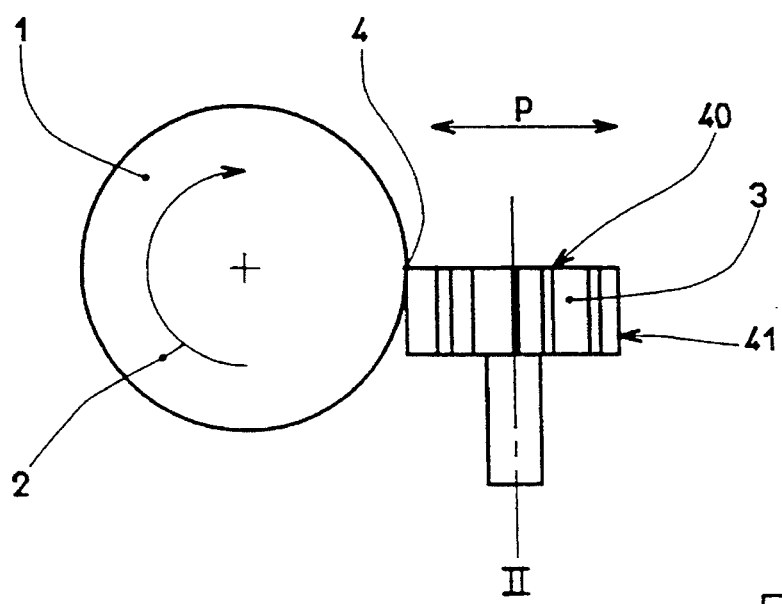
Fig_2

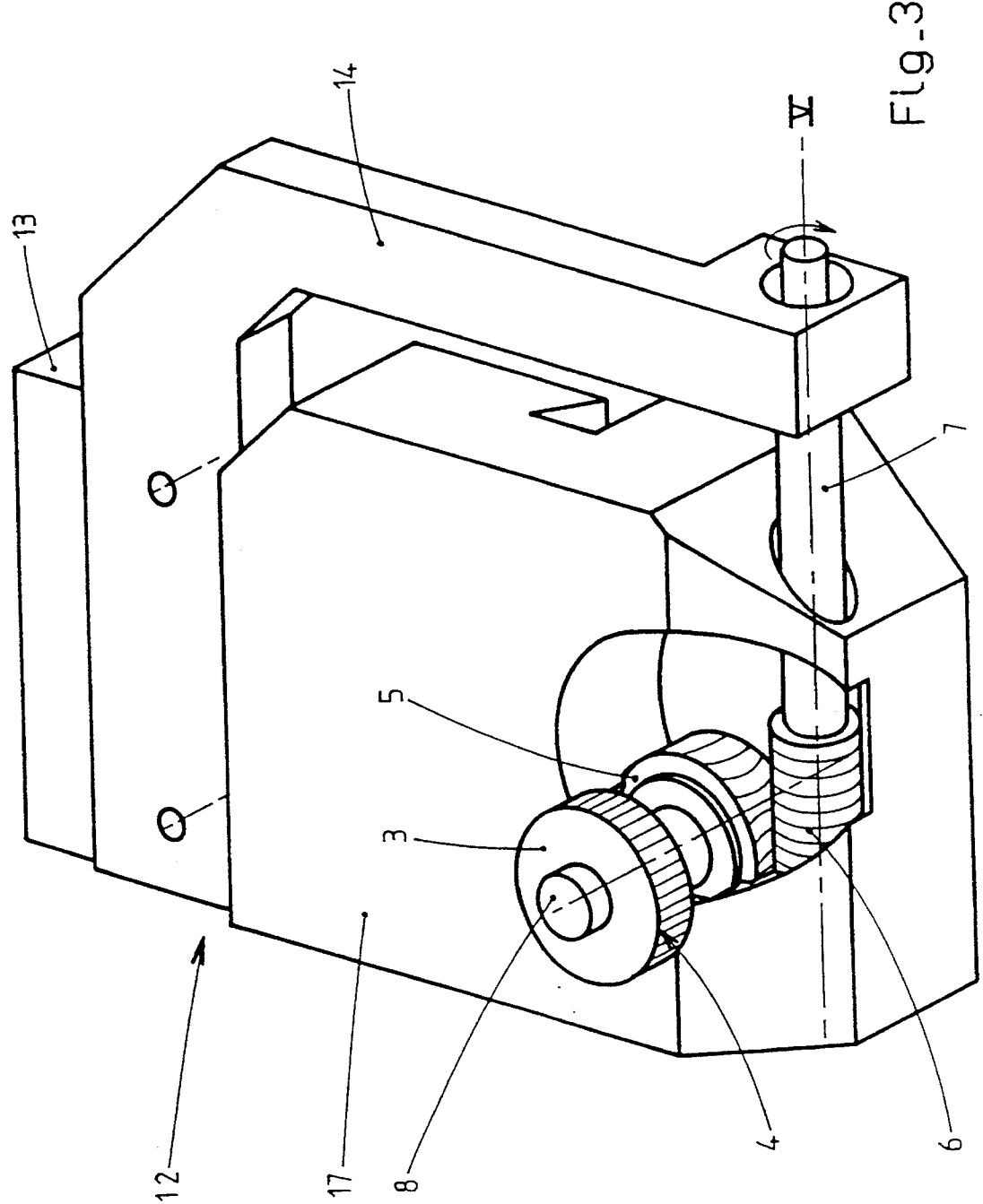

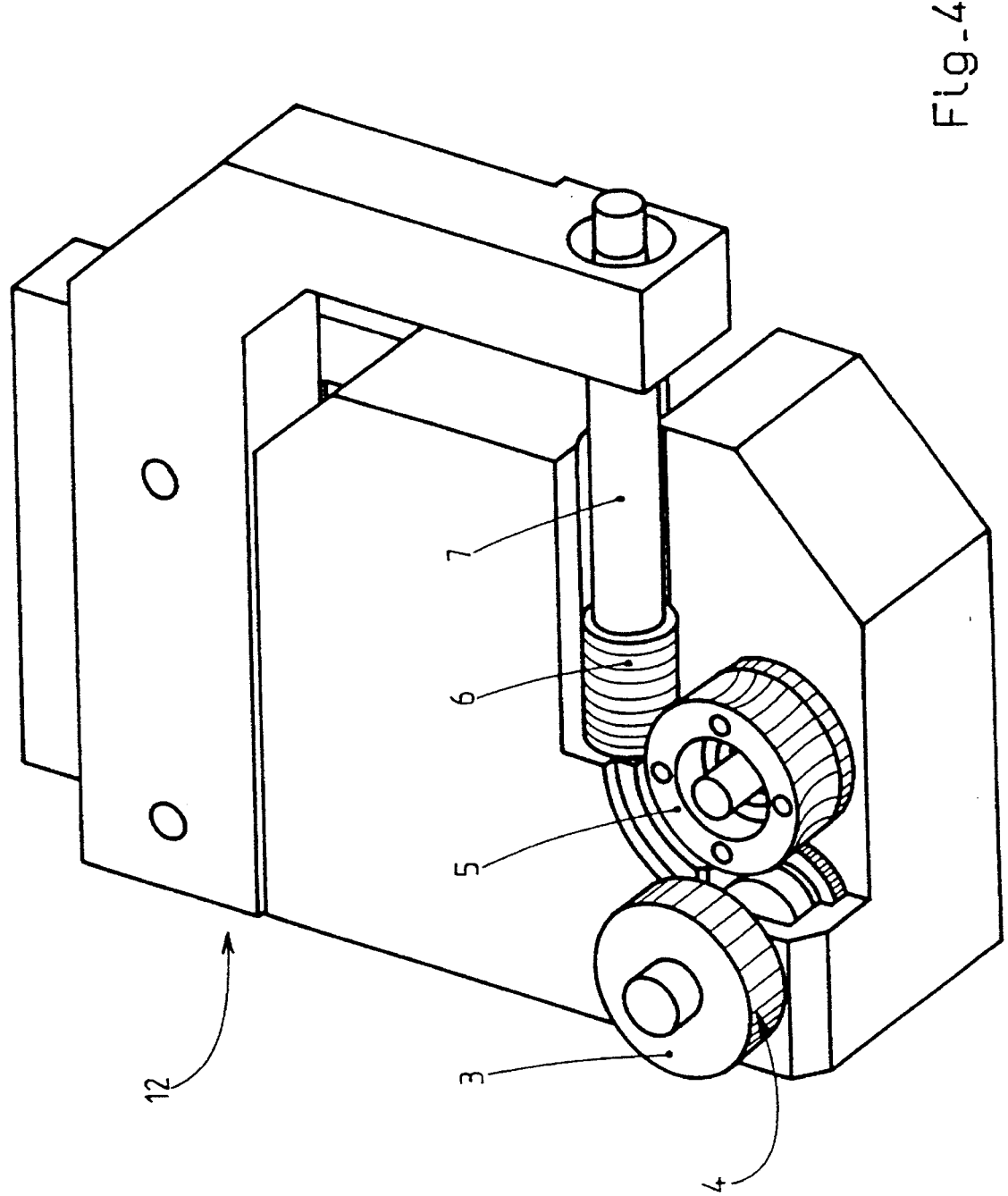

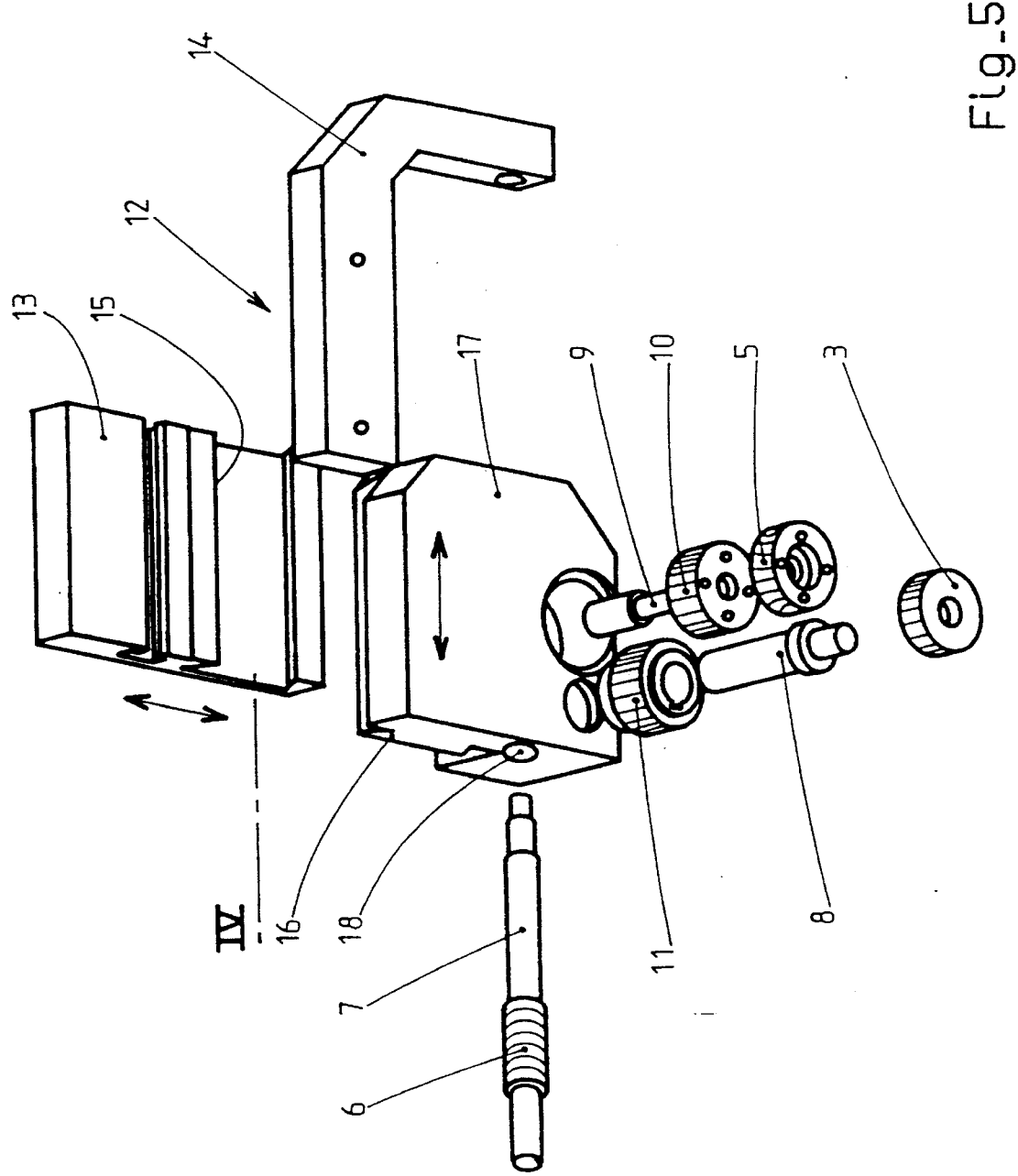
Fig_5

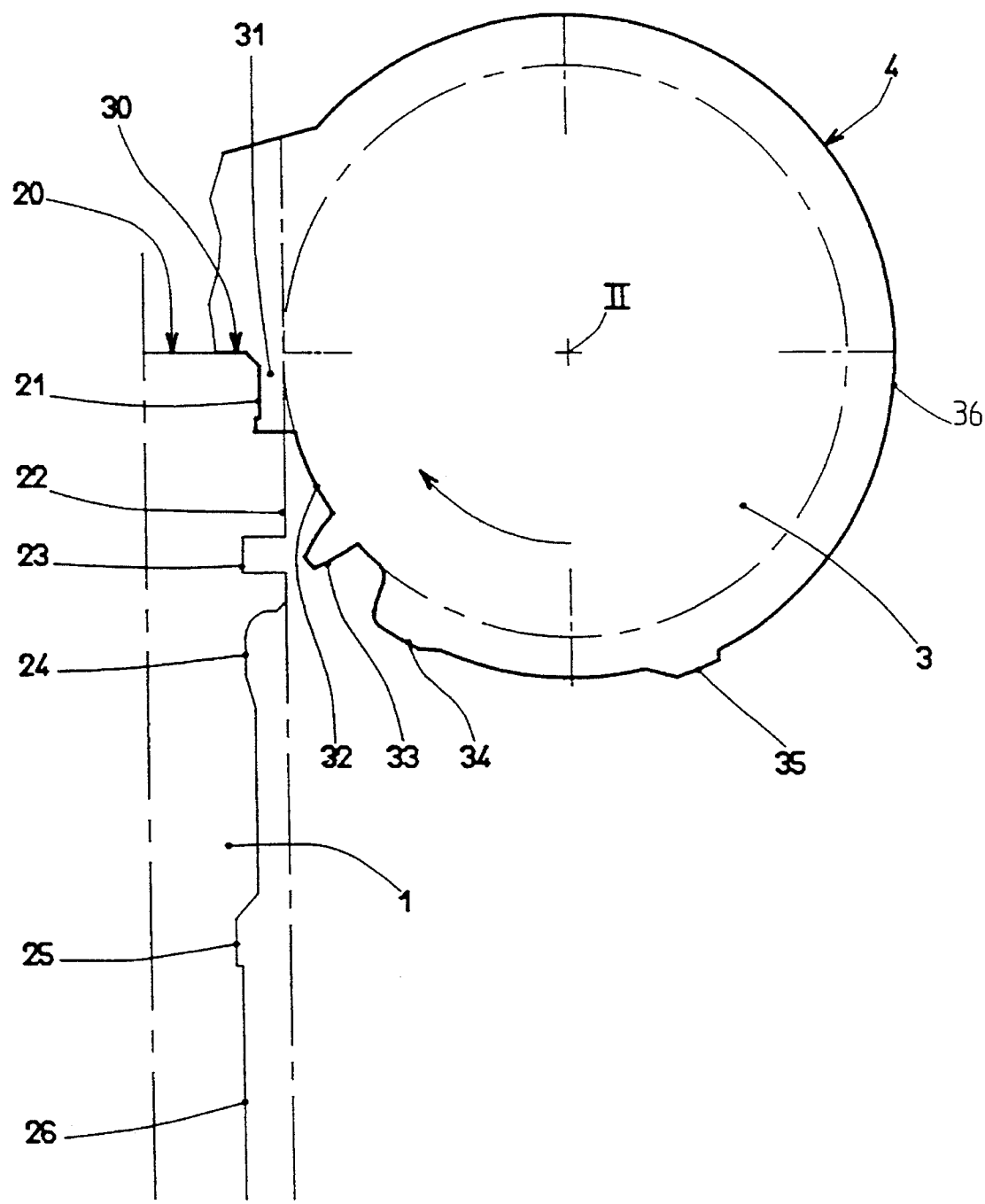
Fig_6

DEVICE FOR MILLING

FIELD OF THE INVENTION

The present invention concerns machining methods and devices for cutting helical screwthreads onto a workpiece held by a headstock spindle of a lathe.

Lathes are usually designed to carry out various machining operations on a workpiece including turning, milling and drilling.

However, lathes as currently used do not have any means of economically cutting helical screwthreads onto the workpiece held by the headstock spindle of the lathe.

At most, a screwthread can be cut on a lathe by successive passes of a cutting tool whose profile is complementary to the gaps between the threads. As the workpiece held by the headstock spindle rotates the cutting tool is pressed against the lateral surface of the workpiece and moved progressively in longitudinal translation according to the pitch of the required thread. A method of this kind requires several successive passes with the same tool, with the result that the operation is time consuming and costly.

Machines for generating and cutting screwthreads have been known for many years, and are described for example in document U.S. Pat. No. 1,461,219. The structure described in this document, published in 1923, is a machine dedicated to cutting threads and unable to perform varied machining operations such as milling, turning and drilling.

Although a structure of this kind has been known for many years, as yet it has not yet been applied to devices fitted to lathes.

SUMMARY OF THE INVENTION

The problem to which the present invention is addressed is to design a new device which can be fitted to a lathe and which is capable of cutting helical threads at a speed compatible with other machining operations that can be carried out on the same lathe.

In particular, the invention is directed to carrying out on the same lathe and on the same workpiece various successive machining operations including the machining of a helical screwthread. In this way a complete workpiece is made on a single machine instead of using a plurality of machines in succession, which enables work to be done in time that would otherwise be wasted and also improves the quality of the workpiece: the concentricity of the various parts of the workpiece is improved, the relative distances between the various parts of the workpiece are more accurate than with successive machining operations and the time wasted in transferring the workpiece between different machines is eliminated.

The invention is further directed to reducing costs by simplifying the machines employed, in particular by making maximum use of the various components of the lathe.

To achieve these and other objects the device for cutting helical screwthreads is adapted to be fitted to a lathe comprising:

- at least one headstock spindle rotated by drive means about a headstock spindle axis and shaped to hold a workpiece,
- at least one toolholder carriage adapted to move in translation along a radial infeed axis perpendicular to the headstock spindle axis,
- means for causing relative movement in translation of the toolholder carriage and the headstock spindle along a carriage axis, characterised in that:

- a turning tool having a continuous toothed cutting edge is mounted to rotate on the toolholder carriage about a rotation axis which is not parallel to the headstock spindle axis,
- the turning tool is rotated by a gearwheel meshing with a lead screw,
- the lead screw is mounted on a shaft oriented in a direction fixed relative to the lathe bed and parallel to the carriage axis, the lead screw shaft being fixed in the direction of axial translation relative to the lathe bed and being rotated by the means for rotating the headstock spindle of the lathe.

In a first embodiment the lead screw shaft is rotated by the headstock spindle motor to which it is coupled by an appropriate mechanical transmission of the lathe.

For example, the lead screw shaft is coupled mechanically to a power take-off of the lathe by a universal joint transmission.

In another embodiment the lead screw shaft is driven by an auxiliary motor controlled by the numerical controller of the lathe.

In all cases the rotation of the turning tool is effected at such a speed that there is substantially no apparent longitudinal slip between the active portion of the cutting edge and the surface of the workpiece.

BRIEF DESCRIPTION OF THE DRAWINGS

Other objects, features and advantages of the present invention emerge from the following description of specific embodiments of the invention given with reference to the appended figures in which:

FIG. 1 is a diagrammatic perspective view of a cutting tool in accordance with the invention cutting a screwthread onto the lateral surface of a workpiece mounted on the headstock spindle of a lathe;

FIG. 2 is a diagrammatic end view of the FIG. 1 combination;

FIG. 3 is a partially cut away perspective view showing a tool and a tool support in accordance with the invention;

FIG. 4 is a perspective view of a tool and its tool support in another embodiment of the invention;

FIG. 5 is an exploded view of the FIG. 4 tool/toolholder combination;

FIG. 6 shows the respective profiles of the tool and the workpiece in an embodiment given by way of example.

DESCRIPTION OF THE PREFERRED EMBODIMENTS

Figure 7:
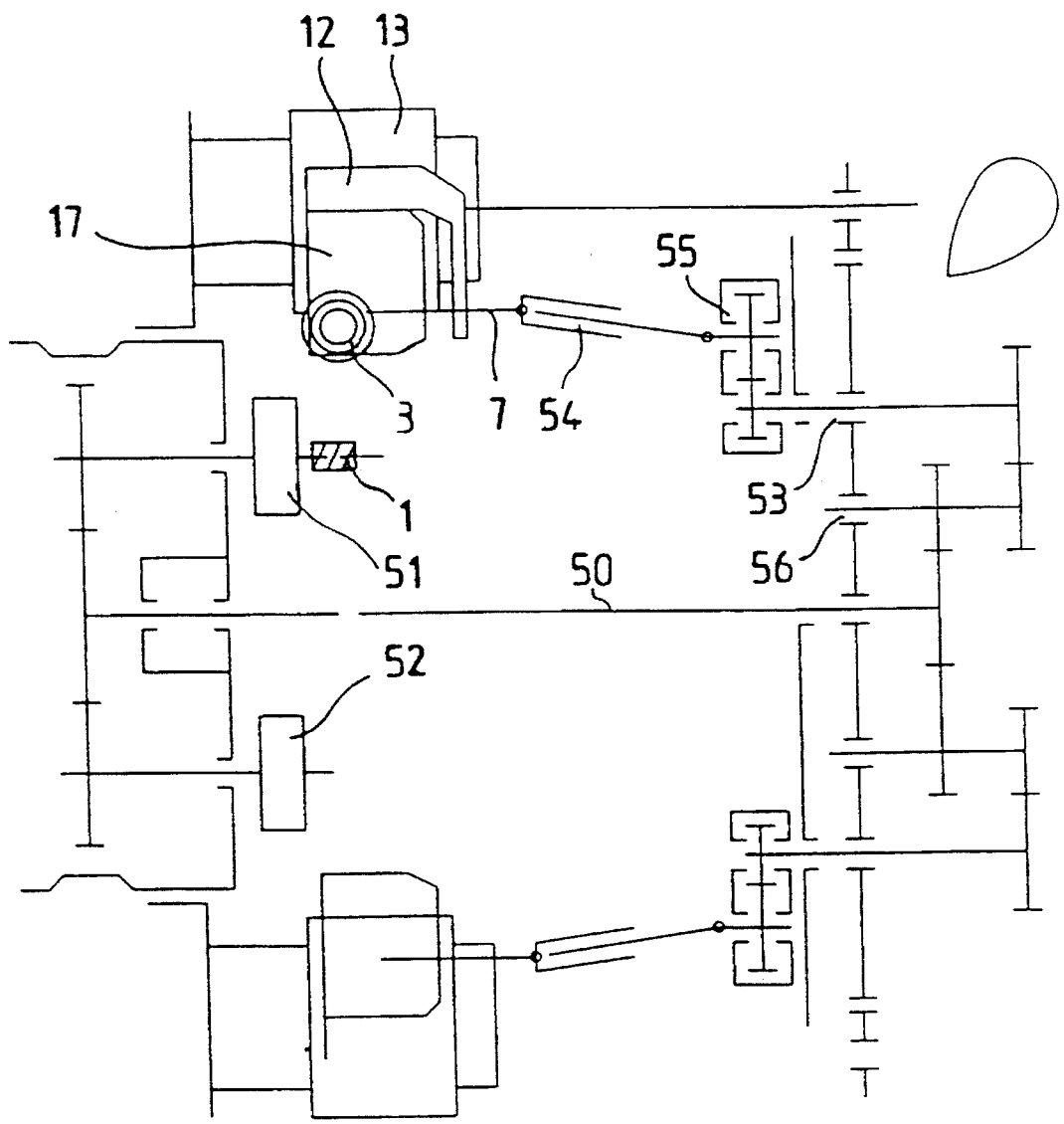
FIG. 7 shows the kinematics of a multispindle lathe fitted with a device in accordance with the invention.

The machining device in accordance with the invention comprises a conventional lathe which can be either a single-spindle lathe or a multi-spindle lathe. Because they are standard and conventional, the main parts of a lathe of this kind are not shown in the drawing. Only FIG. 7 gives a diagrammatic representation of the kinematics of the lathe fitted with the device in accordance with the invention.

The device in accordance with the invention is fitted to a conventional lathe having at least one headstock spindle rotated by drive means about a headstock spindle axis I—I shown in FIG. 1, the headstock spindle being adapted to hold a workpiece 1. The workpiece 1 is thus rotated about the axis I—I of the headstock spindle in a direction represented by the arrow 2.

The lathe conventionally comprises a toolholder carriage, not shown in FIG. 1, adapted to move in translation along a radial infeed axis III perpendicular to the headstock spindle axis I—I, to fix a chosen infeed value P. In a fixed headstock lathe the toolholder carriage can also move in translation on the lathe bed along a carriage axis IV. In a mobile headstock lathe the headstock spindle itself moves in translation along the carriage axis IV, which in this case is parallel to the headstock spindle axis I—I. In all cases there is relative movement of the toolholder carriage and the headstock spindle along the carriage axis IV. To shape a lateral surface of the usually cylindrical workpiece 1 the carriage axis IV is parallel to the headstock spindle axis I—I. To produce a conical workpiece the carriage axis IV can be oblique to the headstock spindle axis I—I. The turning tool 3 is carried by the toolholder carriage and, in the known way, has at least one cutting edge 4 adapted to come into contact with the lateral surface of the workpiece 1 so that, acting against rotation of the workpiece 1 in the direction 2, the cutting edge removes material from the lateral surface of the workpiece 1.

In accordance with the invention, the turning tool 3 used to cut screwthreads comprises a plurality of successive cutting edge portions adapted to come successively into engagement with the workpiece 1 to machine the surface of the workpiece. The device further comprises tool drive means for rotating the turning tool 3 about a rotation axis II which is not parallel to the headstock spindle axis I—I. Rotation of the turning tool 3 about its rotation axis II brings said successive portions of the cutting edge 4 of the turning tool 3 into contact with the workpiece 1.

The tool drive means are adapted to drive the turning tool 3 with a rotation R whose value is dependent on the travel C of the carriage along the carriage axis IV.

In accordance with the invention the rotation R of the turning tool 3 is a linear function of the relative travel C of the carriage and the headstock spindle relative to each other along the carriage axis IV, which function can be represented by the following equation:

$$R = kC + X$$

in which R is the value of the rotation, C is the value of the relative travel of the carriage and the headstock spindle, k is a constant of proportionality and X is a value of rotation which can be either constant or time-dependent or dependent on some other rotation variable.

In the embodiments shown in FIGS. 1 to 6 the turning tool 3 has a continuous cutting edge 4 developed in a plane perpendicular to the rotation axis II of the turning tool 3. The cutting edge 4 is the edge formed at the intersection between a front surface 40 of the tool which is advantageously a plane surface and a lateral surface 41.

With a turning tool 3 of this kind it is possible to produce lateral surfaces of the workpiece 1 either in the shape of a body of revolution about the headstock spindle axis I—I or of helical shape. The embodiments shown in FIGS. 3 to 5 can produce either bodies of revolution or helical shapes.

In these embodiments the turning tool 3 is rotated directly or indirectly by a gearwheel 5 meshing with a lead screw 6. The lead screw 6 is mounted on a shaft 7 oriented in a direction V fixed relative to the lathe bed and parallel to the carriage axis IV. In the case of a fixed headstock lathe the lead screw shaft 7 is fixed relative to the lathe bed in the direction of axial translation. In the case of a mobile headstock lathe the lead screw shaft 7 tracks axial movement of the headstock spindle or, as an alternative to this, further rotation is imparted to the lead screw 6 so that the active surface of the tool follows the movement of the headstock spindle without apparent slip.

In the FIG. 3 embodiment the gearwheel 5 is mounted on the same shaft as the turning tool 3. The lead screw 6 then engages on the same side of the gearwheel 5 as the active part of the cutting edge 4 of the turning tool 3.

In the embodiment of FIGS. 4 and 5 the lead screw 6 bears on the side of the gearwheel 5 opposite the active part of the cutting edge 4 of the turning tool 3. In this case an indirect transmission can be used, the gearwheel 5 being mounted on a secondary shaft 9 parallel to the shaft 8 of the turning tool 3, the secondary shaft 9 carrying a first transmission gear 10 meshing with a second transmission gear 11 in turn carried by the shaft 8 of the turning tool 3. The transmission via the gears 10 and 11 reverses the rotation between the gearwheel 5 and the turning tool 3.

FIGS. 3 to 5 show the general structure of a toolholder 12 in accordance with the invention mounted on the structure of the lathe. The toolholder 12 comprises a fixed assembly in the form of a support 13 and a screw holding member 14. The support 13 is fixed to the lathe bed by fixing means that are not shown. The screw holding member 14 is fixed to the support 13 by fixing means such as fixing means enabling adjustment by longitudinal translation along an axis parallel to the carriage axis IV. The support 13 has longitudinal slideways 15 along the carriage axis IV adapted to receive a corresponding portion 16 of the toolholder carriage 17. The toolholder carriage 17 is therefore mobile in longitudinal translation on the support 13 along the carriage axis IV. The toolholder carriage 17 has a longitudinal passage 18 through which the lead screw 6 and its shaft 7 can slide freely. The screw holding member 14 preferably holds the lead screw 6 and the shaft 7 in a fixed longitudinal position on the lathe bed along the carriage axis IV. Thus during movement along the carriage axis of the toolholder carriage 17 the lead screw 6 and the shaft 7 remain at axial positions fixed relative to the lathe bed.

To machine on a fixed headstock lathe a workpiece 1 whose lateral surface is a body of revolution the lead screw 6 is prevented from rotating and serves as a rack for the gearwheel 5. During movement along the carriage axis the turning tool 3 is therefore subject to a rotation whose value R is directly proportional to the value of the travel C of the carriage 17 along the carriage axis IV. The turning tool 3 has a continuous toothed cutting edge 4 the successive portions of which are adapted to shape the lateral surface of the workpiece 1 as required.

To machine a workpiece whose lateral surface is a body of revolution on a mobile headstock lathe the lead screw 6 can be pivoted by an amount controlled by the advance motion of the headstock spindle and the workpiece to be machined.

To machine a workpiece 1 having a lateral surface with helical threads the lead screw 6 is also caused to rotate, to cause further rotation of the turning tool 3 at a tool rotation speed which is equal to a submultiple of the rotation speed of the headstock spindle.

To achieve this the lead screw shaft 7 can be rotated by the headstock spindle motor itself, to which it is coupled by an appropriate mechanical transmission, shown in FIG. 7. This figure shows the kinematics of a multispindle lathe with a main drive shaft 50 which is adapted to drive all the units of the lathe and in particular the headstock spindles, including the two headstock spindles 51 and 52. Facing each headstock spindle, including the headstock spindle 51, are various power take-offs, for example power take-offs 53 and 56, corresponding to appropriate fractions of the rotation speed of the main shaft 50 and the corresponding headstock spindle 51.

The figure shows toolholders associated with each of the headstock spindles 51 and 52. The toolholder 17 associated with the headstock spindle 51 is movable in longitudinal translation and is actuated by the usual actuator means of the lathe. The toolholder 17 thus slides longitudinally on the support 13 fixed to the lathe bed and drives the tool 3 mounted to rotate on a tool spindle. As previously explained with reference to FIG. 3 or 4, the tool 3 is rotated by a gearwheel meshing with a lead screw carried by a lead screw shaft 7. The lead screw shaft 7 is rotated by the headstock spindle motor to which it is coupled by an appropriate mechanical transmission: as shown, the lead screw shaft 7 is coupled to a power make-off 53 of the lathe by a universal joint transmission 54 and optionally a gear train 55. This makes optimum use of the resources of the lathe for rotating the tool 3 as it moves to enable generation and cutting of screwthreads on the workpiece 1 held by the headstock spindle 51.

As an alternative to this, the lead screw shaft 7 can be driven by an auxiliary motor controlled by the numerical controller of the lathe.

In both cases the rotation R of the turning tool 3 remains a linear function R=kC+X of the travel C of the carriage 17 along the carriage axis IV, the variable X being itself equal to a submultiple of the rotation of the headstock spindle.

A turning method in accordance with the invention using a lathe provided with a workpiece-holding headstock spindle and a turning tool 3 mounted on a toolholder 17 is therefore characterised in that, during turning, the turning tool 3 is progressively pivoted by rotating it about an axis II not parallel to the headstock spindle axis I—I in order to bring successive portions of the cutting edge 4 of the turning tool 3 into contact with the workpiece 1.

The turning tool 3 rotates at a speed such that there is substantially no apparent longitudinal slip between the active portion of the cutting edge 4 and the surface of the workpiece 1.

The device in accordance with the invention can be used to machine diverse shapes on the external surface of a workpiece. The shape of the turning tool 3 is determined according to the shape of the workpiece to be machined. In principle a specific tool must be used for each shape of workpiece.

For example, to machine on the lateral surface of a workpiece 1 annular grooves or ribs, or a helical thread, a turning tool 3 is used whose lateral surface 41 is toothed, as shown diagrammatically in FIG. 1. The cutting edge 4 therefore has an undulating shape, the undulations being chosen according to the size of the screwthreads to be machined on the workpiece 1.

FIG. 6 shows an example of machining a workpiece 1 of varying profile by means of the turning tool 3. The longitudinal profile of the workpiece 1 has a front end surface 20, a cylindrical first segment 21, a larger diameter cylindrical second segment 22, an annular groove 23, an annular recess 24, a second annular recess 25, an end cylindrical part 26. The turning tool 3 itself has a profile such that the cutting edge comprises successive portions each corresponding to specific shapes of the workpiece 1. The cutting 4 therefore has a portion 30 corresponding to the surface 20 of the workpiece, a successive portion 31 corresponding to the segment 21, a second successive portion 32 corresponding to the segment 22, a projecting portion 33 corresponding to the annular groove 23, a slightly projecting portion 34 corresponding to the annular recess 24, another successive portion 35 corresponding to the second annular recess 25 and finally a circular portion 36 corresponding to the cylindrical end part 26, said circular portion 36 being concentric with the rotation axis II of the turning tool.

In all cases the front surface 40 of the turning tool 3 is substantially level with the centre of the workpiece 1, i.e. the plane containing the front surface 40 of the turning tool 3 contains the headstock spindle axis I—I.

The present invention is not limited to the embodiments specifically described but encompasses the diverse variants and generalisations thereof within the scope of the following claims.

I claim:

1. Lathe adapted to turn workpieces (1), said lathe comprising a bed carrying:

at least one headstock spindle rotated by drive means about a headstock spindle axis (I—I) and shaped to hold a workpiece (1) to be machined, at least one toolholder carriage (17) adapted to carry at least one turning tool (3) and to move in translation on the lathe bed along a radial infeed axis (III) perpendicular to the headstock spindle axis (I—I), means for causing relative movement in translation of the toolholder carriage (17) and the headstock spindle on the lathe bed along a carriage axis (IV), characterised in that:

at least one of the turning tools (3) has a continuous toothed cutting edge (4) and is mounted to rotate on the toolholder carriage (17) about a rotation axis (II) which is not parallel to the headstock spindle axis (I—I), said turning tool (3) is rotated by a gearwheel (5) mounted on the toolholder (17) and meshing with a lead screw (6), the lead screw (6) is mounted on a shaft (7) oriented in a direction (V) fixed relative to the lathe bed and parallel to the carriage axis (IV), the lead screw shaft (7) being fixed in the direction of axial translation relative to the lathe bed and being rotated by the means for rotating the headstock spindle of the lathe.

2. Lathe according to claim 1 characterised in that the lead screw shaft (7) is rotated by the headstock spindle motor to which it is coupled by an appropriate mechanical transmission of the lathe.

3. Lathe according to claim 2 characterised in that the lead screw shaft (7) is coupled mechanically to a power take-off (53) of the lathe by a universal joint transmission (54).

4. Lathe according to claim 1 characterised in that the lathe is controlled by a numerical controller, wherein the lead screw shaft (7) is driven by an auxiliary motor controlled by the numerical controller of the lathe.

5. Lathe according to claim 1 wherein the lathe is a multispindle lathe with a main drive shaft (50) driving all parts of the lathe and in particular a plurality of workpiece-holding headstock spindles (51, 52) each associated with a toolholder movable in translation on the lathe bed, one of the toolholders (17) associated with one of the headstock spindles (51) carrying a tool (3) rotatable about a tool rotation axis by a gearwheel meshing with a lead screw carried by a lead screw shaft (7) rotated by a power take-off (53) of the lathe to which it is coupled by a universal joint transmission (54).

* * * * *